United States Patent
Henderson et al.

(10) Patent No.: US 8,432,112 B2
(45) Date of Patent: Apr. 30, 2013

(54) SENSORLESS LOST/FOUND ROTOR DETECTION FOR PERMANENT MAGNET MOTORS

(75) Inventors: Michael I. Henderson, Leeds (GB); Joseph G. Marcinkiewicz, Weldon Springs, MO (US); John Stephen Thorn, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 542 days.

(21) Appl. No.: 12/570,504

(22) Filed: Sep. 30, 2009

(65) Prior Publication Data

US 2011/0068724 A1    Mar. 24, 2011

Related U.S. Application Data

(60) Provisional application No. 61/244,760, filed on Sep. 22, 2009.

(51) Int. Cl.
*H02P 6/18* (2006.01)

(52) U.S. Cl.
USPC .......... 318/400.21; 318/400.32; 318/701; 318/807; 318/508

(58) Field of Classification Search .......... 318/400.21, 318/400.32, 439, 701, 807, 508
See application file for complete search history.

(56) References Cited

U.S. PATENT DOCUMENTS

| | | | |
|---|---|---|---|
| 5,172,041 A | 12/1992 | Bavard et al. | |
| 5,296,793 A | 3/1994 | Lang | |
| 5,367,236 A | 11/1994 | Salazar | |
| 5,547,435 A | 8/1996 | Grutter et al. | |
| 5,635,810 A * | 6/1997 | Goel | 318/719 |
| 6,163,127 A | 12/2000 | Patel et al. | |
| 6,756,753 B1 | 6/2004 | Marcinkiewicz | |
| 6,759,827 B2 * | 7/2004 | Kawashima | 318/727 |
| 6,831,439 B2 * | 12/2004 | Won et al. | 318/701 |
| 6,979,974 B2 | 12/2005 | Slater et al. | |
| 7,038,423 B2 | 5/2006 | Reed et al. | |
| 7,208,895 B2 | 4/2007 | Marcinkiewicz et al. | |
| 7,342,379 B2 | 3/2008 | Marcinkiewicz et al. | |
| 7,375,485 B2 | 5/2008 | Shahi et al. | |
| 7,504,797 B2 * | 3/2009 | Tomigashi et al. | 318/807 |
| 7,554,281 B2 * | 6/2009 | Satake et al. | 318/432 |
| 7,583,049 B2 | 9/2009 | Marcinkiewicz et al. | |
| 7,615,953 B2 | 11/2009 | Doglioni Majer | |
| 7,667,423 B2 | 2/2010 | Shahi et al. | |

* cited by examiner

*Primary Examiner* — Walter Benson
*Assistant Examiner* — David Luo
(74) *Attorney, Agent, or Firm* — Harness, Dickey, & Pierce, P.L.C.

(57) ABSTRACT

Various methods of detecting a found rotor, a lost rotor, a locked rotor and a caught rotor after a power disruption using flux estimates are disclosed. Also disclosed are permanent magnet motor controllers and assemblies suitable for performing one or more of these methods.

29 Claims, 7 Drawing Sheets

SENSORLESS LOST/FOUND ROTOR DETECTION FOR PERMANENT MAGNET MOTORS

CROSS-REFERENCE TO RELATED APPLICATIONS

This application claims the benefit of U.S. Provisional Application No. 61/244,760, filed on Sep. 22, 2009, the entire disclosure of which is incorporated herein by reference.

FIELD

The present disclosure relates to sensorless detection of rotor position and/or speed in permanent magnet motors, including detecting when a rotor is lost or found for purposes of controlling the motor.

BACKGROUND

This section provides background information related to the present disclosure which is not necessarily prior art.

Permanent magnet motors typically include a stator and a rotor that rotates within or around the stator. The speed and angular position of the rotor are commonly used to generate control signals for the motor. Traditionally, the speed and angular position of the rotor are determined via one or more rotor position sensors. More recently, techniques have been developed and used for determining the speed and angular position of the rotor sensorlessly (i.e., without direct measurement of the rotor speed or position). For example, flux of the motor may be estimated and used to estimate the rotor speed and/or position. The estimated flux is not used, however, when starting these motors. Instead, the motors are controlled without relying on estimated flux until a preset time period has elapsed, or until the motor reaches a defined speed, torque output, etc. At that point, the flux estimates are assumed to be sufficiently accurate, and the motor control begins using the estimated flux to control the motor.

After some period of time, and possibly due to some external factor, the flux estimate in the prior art controller could become unreliable. In that event, the rotor position and speed estimate become unreliable resulting in the drive tripping or problematic oscillation.

SUMMARY

This section provides a general summary of the disclosure, and is not a comprehensive disclosure of its full scope or all of its features.

According to one aspect of the present disclosure, a method of controlling a permanent magnet motor is disclosed. The method includes estimating flux of the motor, determining whether the estimated flux has substantially converged toward an actual flux of the motor and, in response to determining the estimated flux has substantially converged toward the actual flux, using the estimated flux to control the motor.

According to another aspect of this disclosure, a method of operating a permanent magnet motor is disclosed. The method includes estimating flux of the motor, using the estimated flux to control the motor, determining whether the estimated flux has substantially diverged from an actual flux of the motor and, in response to determining the estimated flux has substantially diverged from the actual flux, discontinuing use of the estimated flux to control the motor.

According to yet another aspect of this disclosure, another method of controlling a permanent magnet motor is disclosed. The method includes estimating flux of the motor, monitoring power to a drive for the motor, detecting when the power to the drive returns to a defined level after falling below the defined level and, after the power to the drive returns to the defined level, determining whether the estimated flux has substantially converged toward an actual flux of the motor. The method further includes, if the estimated flux is determined to have substantially converged toward the actual flux, using the estimated flux to generate control signals for the motor.

According to still another aspect of this disclosure, yet another method of controlling a permanent magnet motor is disclosed. The method includes estimating flux of the motor during start-up of the motor, determining whether the estimated flux has substantially converged toward an actual flux of the motor within a defined time period and, in response to determining the estimated flux has not substantially converged toward the actual flux during the defined time period, stop attempting to spin the motor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
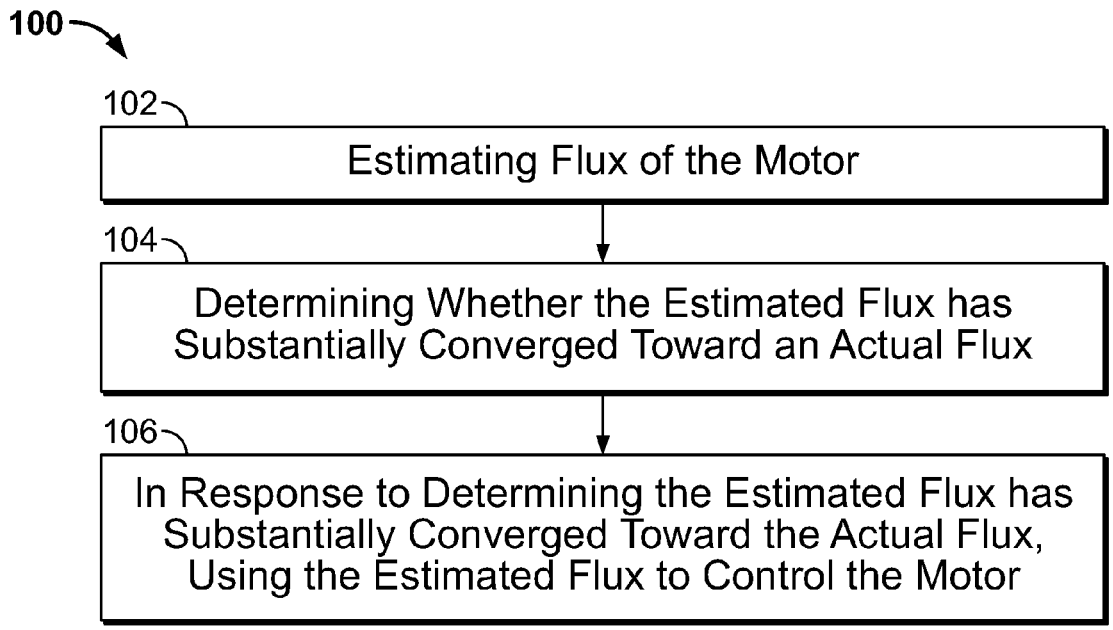
FIG. 1 is a block diagram of a method of detecting a found rotor according to one aspect of the present disclosure.

FIG. 1 illustrates a method 100 of controlling a permanent magnet motor according to one aspect of the present disclosure. The method includes, in block 102, estimating flux of the motor and, in block 104, determining whether the estimated flux has substantially converged toward an actual flux of the motor. The method further includes, in block 106, in response to determining the estimated flux has substantially converged toward the actual flux, using the estimated flux to control the motor. In this manner, the estimated flux can be used to control the motor immediately after determining the estimated flux has substantially converged. This can minimize the amount of time a motor is controlled without using the estimated flux (e.g., in an open loop control mode). Alternatively, the estimated flux may not be used to control the motor until a defined time after the estimated flux is determined to have substantially converged. For example, the estimated flux may not be used for control purposes until a predefined delay period has expired, or until an operating condition of the motor is satisfied, etc., after the estimated flux is determined to have substantially converged. The method described above can be used during start-up and/or at any other suitable time when the motor is operating.

For purposes of this disclosure, the estimated flux is considered to have substantially converged toward the actual flux when the estimated flux is within a defined margin of error relative to the actual flux, such that the estimated flux can be used to effectively control the motor. The margin of error may be defined as a constant value (that may or may not vary during operation of the motor, e.g., in response to an operating condition of the motor), as a statistical measure and/or as otherwise appropriate for any given application of these teachings. Whether the estimated flux is within the defined margin of error at any given time can be determined in a variety of ways, some examples of which are described below. The rotor is considered to be "found" when the estimated flux has substantially converged toward the actual flux of the motor.

The flux of the motor can be estimated using any suitable technique (including those known now or in the future). Typically, flux (e.g., magnet flux and/or linkage flux) is estimated in a selected reference frame using an observer (also called an estimator) such as a Kalman observer, a Luenberger observer, etc. The selected reference frame may include stationary reference frames such as the stator reference frame (e.g., the two phase alpha beta or three phase ABC reference frame) and rotating reference frames such as the electrical reference frame, the rotor reference frame that is synchronous with the rotor, the Theta_v reference frame (also called the drive or command reference frame) that is synchronous with the commanded speed omega_v, or an arbitrary reference frame that is rotated at a particular angular velocity synchronous with another system parameter. However, other suitable techniques for estimating flux can be used in any given application of these teachings. Further, the flux may be estimated using measured, estimated or demanded phase currents and/or phase voltages of the motor and or inverter bus voltage and/or device currents (measured, estimated or demanded).

Similarly, a variety of techniques may be employed for determining whether the estimated flux has substantially converged toward the actual flux of the motor. For example, another motor operating parameter can be calculated in a selected reference frame using the estimated flux, and then compared with a measured value of that operating parameter in the same reference frame. The difference between the estimated and measured values is related to the difference between the estimated and actual flux of the motor, and can be used to determine whether the estimated flux has substantially converged toward the actual flux (as well as to correct a next estimate of the flux, if desired). In some embodiments, phase currents are calculated using the estimated flux and compared with measured phase currents to determine whether the estimated flux is within a defined margin of error relative to the actual flux of the motor. Alternatively, and assuming the actual flux of the motor cannot be measured directly, a different parameter such as angle or speed can be estimated and compared to a measured value to determine whether the estimated flux is within the defined margin.

The estimated and measured values of the motor operating parameter may be processed as an error signal to determine whether the estimated flux has substantially converged toward the actual flux. This processing may include producing statistical information (mean, variance, standard deviation, etc.) for the error signal, and may be performed, for example, by a digital filter implementing a suitable function such as a recursive rolling mean. In some embodiments, the statistical information is used to increment or decrement a counter, with the value of the counter representing convergence of the estimated flux when the counter value is within a defined range. The counter rules applied may depend on whether convergence has been detected, on an operating state of the motor, and/or other condition(s).

The estimated flux can be used to control the motor according to the particular motor control scheme employed including, e.g., flux control and current control schemes, where the flux or current of the motor is controlled via an applied voltage. Typically, the flux or current of the motor is controlled in response to a high level input demand such as a torque, speed, current or other demand signal. Further, the motor control scheme employed may be sensorless (i.e., where mechanical angle and speed are not measured directly but rather estimated from variation in motor variables, such as phase current and voltage) or, alternatively, rely on a rotor position sensor. In any event, using the estimated flux to control the motor will typically include estimating the value of another motor operating parameter using the estimated flux, and using the estimated value to control the motor. For example, estimated magnet flux can be used to estimate electrical angle and speed. The estimated angle may then be used in a rotating reference frame current controller, and/or the estimated speed may be used in a speed controller.

In response to determining the estimated flux has substantially converged toward the actual flux of the motor, control of the motor may, in some embodiments, transition from one control scheme to another. For example, the motor may be controlled in an open loop control mode, and then transitioned to a closed loop control mode after the estimated flux is determined to have converged. The estimated flux may then be used in the closed loop control mode—which may be a closed loop sensorless control mode—to control the motor.

Figure 2:
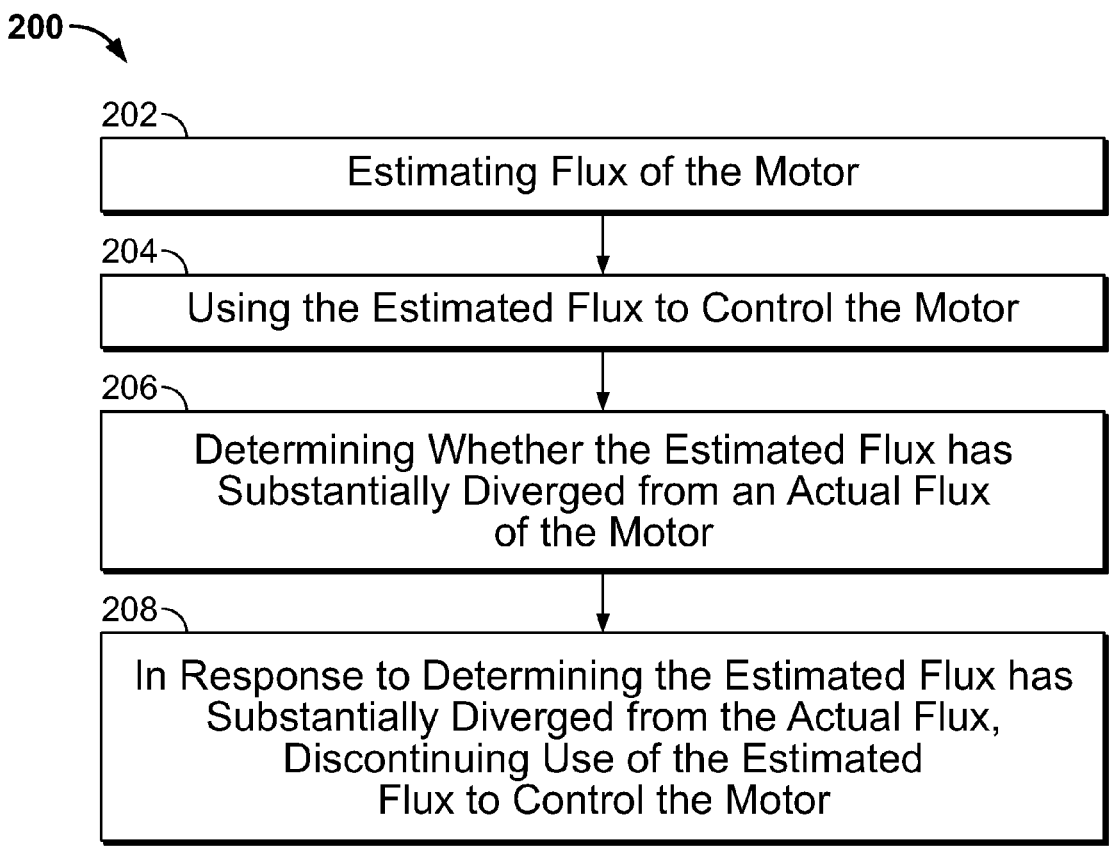
FIG. 2 is a block diagram of a method of detecting a lost rotor according to another aspect of the present disclosure.

FIG. 2 illustrates a method 200 of operating a permanent magnet motor according to another aspect of the present disclosure. The method 200 includes estimating flux of the motor in block 202, using the estimated flux to control the motor in block 204, and determining whether the estimated flux has substantially diverged from an actual flux of the motor in block 206. The method 200 further includes, in block 208, in response to determining the estimated flux has substantially diverged from the actual flux, discontinuing use of the estimated flux to control the motor.

The flux can be estimated and used to control the motor in any suitable manner including those described above. Similarly, a variety of techniques may be employed for determining whether the estimated flux has substantially diverged from the actual flux of the motor, including techniques similar to those described above. For purposes of this disclosure, the estimated flux is considered to have substantially diverged from the actual flux when the estimated flux is no longer within a defined margin of error relative to the actual flux, such that the estimated flux can no longer be used to effectively control the motor. The defined margin of error may be defined as a constant value (that may or may not vary during operation of the motor, (e.g., in response to an operating condition of the motor), as a statistical measure and/or as otherwise appropriate for any given application of these teachings. The rotor is considered to be "lost" when the estimated flux has substantially diverged from the actual flux of the motor.

Upon determining the estimated flux has substantially diverged from the actual flux of the motor, control of the motor may continue while use of the estimated flux to control the motor is discontinued. In that event, control of the motor may transition from one control scheme to another. For air moving (including HVAC fans and blowers) and other applications, the control may transition from a closed loop control mode that uses the estimated flux to an open loop control mode that does not use the estimated flux. As another example, applicable to compressor and other applications, the overall control scheme may transition from a speed control mode to a torque control mode upon detecting a lost rotor, with an appropriate adjustment (if necessary) to the torque demand (e.g., setting the torque demand to a maximum value) to execute a failsafe mode of operation. In any event, the control may attempt to find the rotor using the method described above while the motor is operated according to another control scheme. This may include adjusting a speed, torque, current or other demand to aid in finding the rotor. Alternatively, the control may simply shutdown and restart the motor after detecting a lost rotor.

Figure 3:
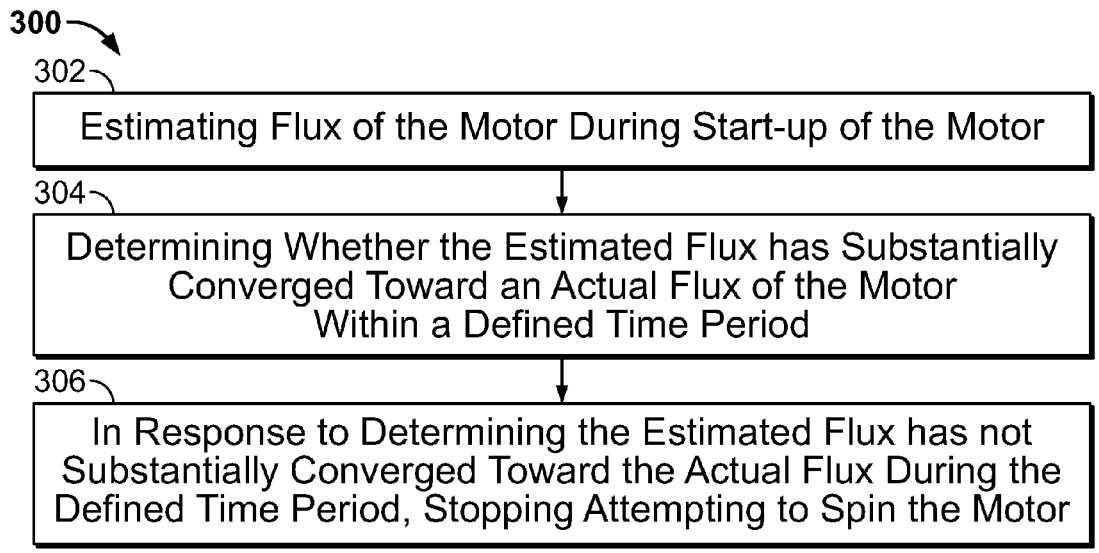
FIG. 3 is a block diagram of a method of detecting a locked rotor condition upon start-up according to yet another aspect of this disclosure.

FIG. 3 illustrates a method 300 of controlling a permanent magnet motor according to another aspect of the present disclosure. The method 300 includes estimating flux of the motor during start-up of the motor in block 302, and determining whether the estimated flux has substantially converged toward an actual flux of the motor within a defined time period in block 304. The method 300 further includes, in response to determining the estimated flux has not substantially converged toward the actual flux during the defined time period, stopping attempting to spin the motor in block 306. In this manner, the motor and drive can be protected once a locked rotor condition is detected.

The flux can be estimated during start-up of the motor in any suitable manner, including with the method described above. Similarly, a variety of techniques may be employed for determining whether the estimated flux has substantially converged toward the actual flux of the motor within the defined time period, including the techniques described above. The minimum time period can be set as desired in any given implementation of these teachings. For example, in some embodiments, the minimum time period is defined as the expected acceleration ramp time plus ten to twenty electrical cycles.

The method may further include attempting to restart the motor a defined time after stopping attempting to spin the motor, and/or raising a locked rotor flag in response to determining the estimated flux has not substantially converged toward the actual flux during the defined time period.

Figure 4:
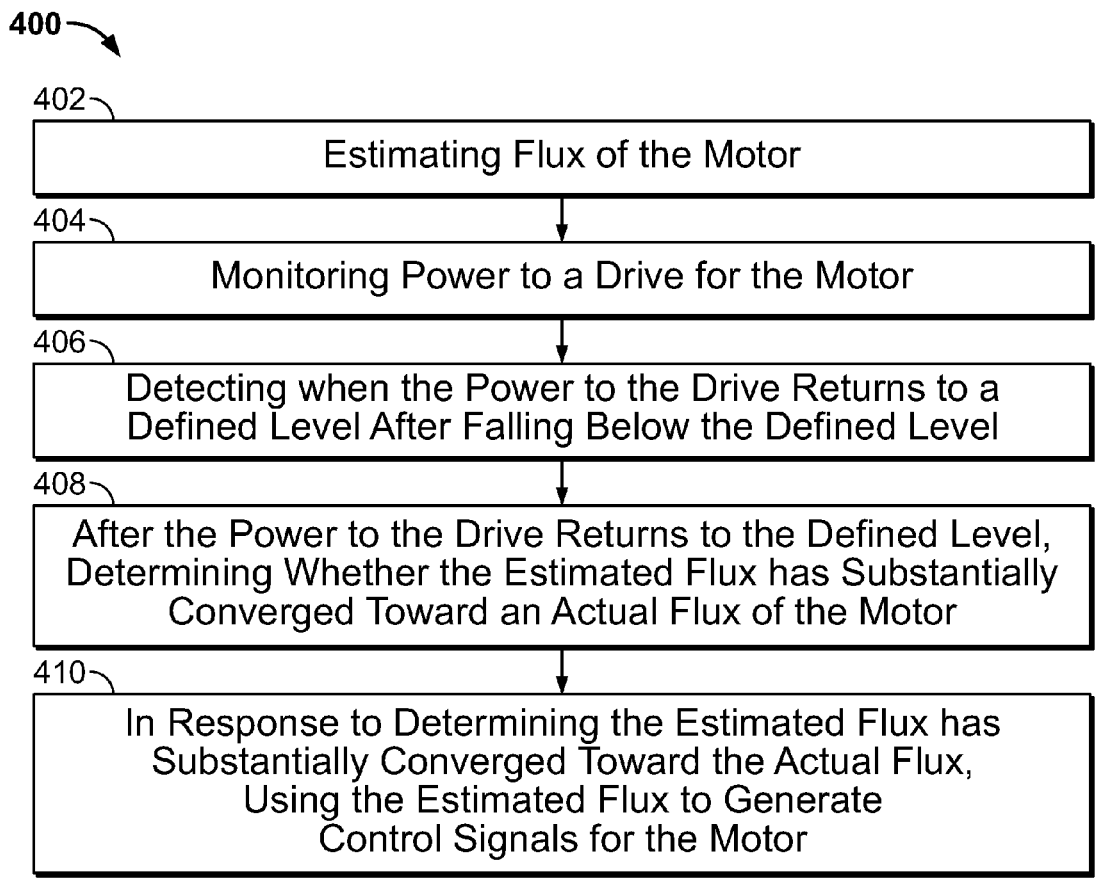
FIG. 4 is a block diagram of a method of catching a rotor after a power disruption according to still another aspect of this disclosure.

FIG. 4 illustrates a method 400 of controlling a permanent magnet motor having a rotor according to another aspect of the present disclosure. The method 400 includes estimating flux of the motor in block 402, monitoring power to a drive for the motor in block 404, detecting when the power to the drive returns to a defined level after falling below the defined level in block 406 and, after the power to the drive returns to the defined level, determining whether the estimated flux has substantially converged toward an actual flux of the motor in block 408. The method 400 further includes, in response to determining the estimated flux has substantially converged toward the actual flux, using the estimated flux to generate control signals for the motor in block 410. In this manner, the rotor can be "caught" after a power disruption without requiring a power-down and restart of the motor.

The flux can be estimated, a determination can be made (after power to the drive returns to the defined level) as to whether the estimated flux has substantially converged toward the actual flux, and the estimated flux can then be used to generate control signals for the motor (including control signals provided to a drive of the motor) using any suitable techniques including those described above. Similarly, the power to the drive can be monitored, and the return of power to the defined level (such as a defined voltage or power level) can be detected, in any suitable way including those commonly employed in the motor industry.

In many cases, control of the motor is suspended, and power may be removed from the drive, when the power level falls below a defined level. As a result, the rotor will be coasting down in speed when power returns to the defined level and, thus, when determining whether the estimated flux has substantially converged toward the actual flux of the motor. In some embodiments, if the estimated flux is not determined to have substantially converged toward the actual flux after power to the drive returns to the defined level, the rotor is allowed to stop and the motor can then be restarted, if desired. Alternatively, if the estimated flux is determined to have substantially converged toward the actual flux after the power for the drive returns to the defined level, power may be reapplied to the drive (if it was removed after detecting the power disruption) before and when the estimated flux is used to generate control signals.

It should be understood that the teachings above related to finding a rotor, detecting a lost rotor, detecting a locked rotor condition, and catching a rotor following a power disruption can be implemented independently or in combination with one or more of the other teachings. For the combined embodiments, more than one defined margin of error may be employed. For example, the defined margin of error for determining whether the rotor is caught following a power disruption can be different than the defined margin(s) of error for determining whether the rotor is found, lost and/or locked.

Figure 5:
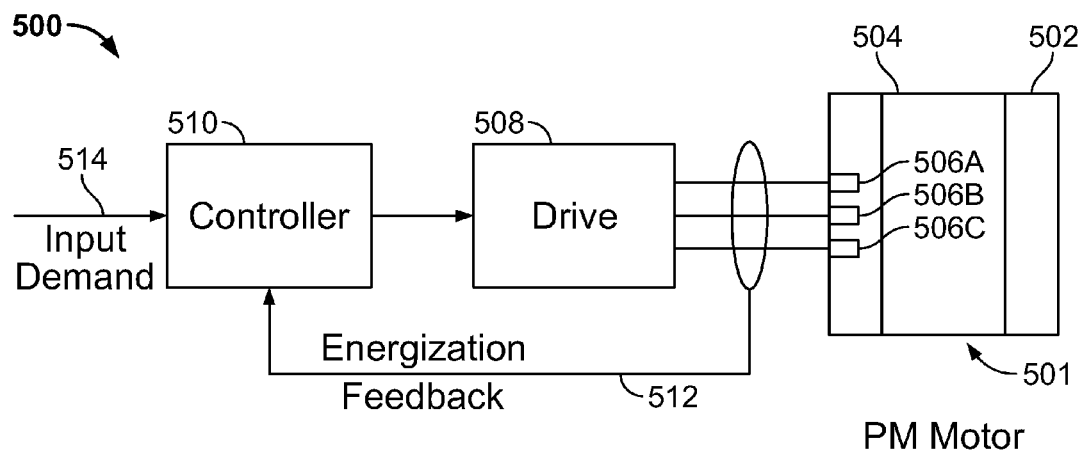
FIG. 5 is a block diagram of an example permanent magnet motor assembly according to some embodiments of the present disclosure.

FIG. 5 illustrates an example motor assembly 500 according to some embodiments of this disclosure. As shown in FIG. 5, the assembly 500 includes a permanent magnet motor 501 having surface and/or embedded magnets on or in the rotor, such as a permanent magnet alternating current (PMAC) motor or a hybrid permanent magnet/switched reluctance (PM/SR) motor. Other examples of permanent magnet motors include flux guided permanent magnet machines, embedded magnet permanent magnet machines, inset permanent magnet machines, axial permanent magnet machines, and outer rotor permanent magnet machines. The permanent magnet motor 501 shown in FIG. 5 includes a stator 502 and an inner rotor 504. Alternatively, other types of permanent magnet motors, including those employing an outer rotor design (where the rotor spins around the stator) can be used.

In the example of FIG. 5, the motor 501 is a three phase motor with energizable phase windings 506A, 506B, 506C wound about the stator 502. The windings 506A, 506B, 506C are energized through the application of electric power to the motor phase terminals.

A drive 508 is coupled to the phase terminals of the motor for providing electric power to the terminals in response to control signals from a controller 510. The controller 510 receives energization feedback 512 from the motor (such as the currents and/or voltages at the motor terminals) and/or assumes the voltages supplied to the phase terminals are the same as the voltages demanded by the controller 510 (i.e., via the control signals provided to the drive 508). As shown in FIG. 5, the controller receives an input demand 514 that may be, for example, a torque demand, a speed demand, a current demand, etc. Further, the controller 510 may be configured to estimate flux of the motor 501 and use the estimated flux to perform flux control, current control, or other suitable control of the motor 501 (with or without the aid of a rotor position sensor).

While the drive 508 of FIG. 5 is illustrated in exemplary form as energizing three power terminals of a three phase motor 501, it should be understood that more or fewer power terminals may be provided to accommodate motors with more or less than three phases, or if various types of inverters (e.g., with neutral connections) are used. The drive may be of conventional design and configured to provide, e.g., sinewave excitation or square wave excitation to the motor terminals.

The controller 510 of FIG. 5 may be configured to perform any or all of the aspects described above, including detecting a found rotor, detecting a lost rotor, catching a rotor following a power disruption and/or detecting a locked rotor upon startup.

One example embodiment of the assembly shown in FIG. 5 will now be described with reference to FIGS. 6-8. In this particular example, the controller is configured to detect when the rotor is lost, found, locked or caught after a power disruption using a Luenberger observer for estimating magnet flux and flux linkage.

In general, a function representing the estimator states and drive states is calculated. A measure of the function behavior is then made, such as by approximating one or more suitable statistics. The value of the behavior measure can then be used to indicate whether the estimated flux has substantially converged toward (or diverged from) the actual flux of the motor. For example, the behavior measure may be used with one or more counters to determine convergence or divergence. Counters are a simple way to manage the lost/found rotor determination and deal with the issue of false alarms (i.e., the incorrect indication of convergence or divergence). Additionally, counters remove the possibility of rapid and inappropriate oscillation between convergence and divergence states by appropriate definition of the counter rules. It should be understood, however, that the teachings of this disclosure can be implemented without using counters, and that use of a counter in a particular embodiment may depend on how the behavior measure is defined.

Generating the Function Representing Estimate and Drive States

In this example, the function (e.g., signal) representing the estimator and drive states is an error function. To generate the error function, an estimated value of a motor operating parameter is compared with a measured value of the same parameter. In this particular case, the estimated flux can be divided by the inductance of the motor to estimate current flow in the drive reference frame. The estimated current flow can then be compared with the actual (measured) flow of current in the drive reference frame to generate the error function (sometimes called the observation variable). In addition to indicating convergence and divergence, the error function can also be used to correct the flux estimate at the next sample interval.

Figure 6:
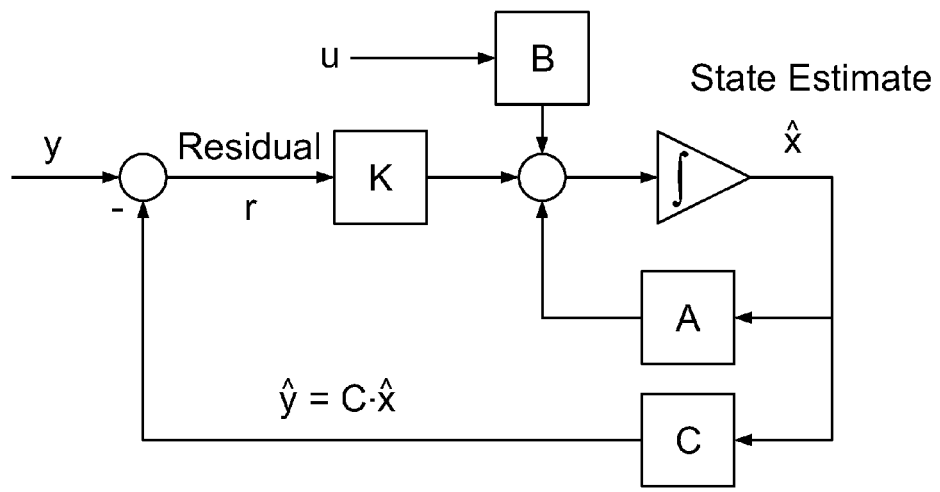
FIG. 6 is a block diagram of a Luenberger observer employed in one example of the present disclosure.

FIG. 6 illustrates the Luenberger observer for this particular example. As noted above, the observer estimates magnet flux and flux linkage. The presence of an estimate is indicated by a hat symbol over the variable name, and so:

Magnet flux = $\hat{\lambda}_{fQdv}$

Flux linkage = $\hat{\lambda}_{Qdv}$

Calculated current flowing, using the flux estimate = $\hat{I}_{Qdv} = \begin{pmatrix} \hat{I}_{Qv} \\ \hat{I}_{dv} \end{pmatrix}$ Actual current flowing = $I_{Qdv} = \begin{pmatrix} I_{Qv} \\ I_{dv} \end{pmatrix}$ In this example, the error signal within the Luenberger Observer is given by:

$$\delta I_{Qdv} = I_{Qdv} - \hat{I}_{Qdv} \qquad (1)$$

where:

$$\hat{I}_{Qdv} = \begin{pmatrix} \frac{1}{L+M} & 0 & \frac{-1}{L+M} & 0 \\ 0 & \frac{1}{L+M} & 0 & \frac{-1}{L+M} \end{pmatrix} \cdot \begin{pmatrix} \lambda_{Qv} \\ \lambda_{dv} \\ \lambda_{fQv} \\ \lambda_{fdv} \end{pmatrix}$$

In the drive frame of reference, the state estimates may exhibit low frequency oscillation. Although it is possible to deal with such issues in the calculation of an appropriate measure, it is easier to avoid this issue altogether. This is done by transforming Equation (1) into the electrical frame of reference:

$$\delta I_{Qdr} = I_{Qdr} - \hat{I}_{Qdr} \quad (2)$$

This value is now quasi-stationary which simplifies the issue of estimating mean, variance and standard deviation, which are the methods of measuring the behavior of the error signal in this example embodiment.

Measuring the Behavior of the Generated Function

The error signal is now processed to generate what may be termed the alarm signal. The alarm signal is typically a stream of statistical information about the error signal.

As the estimated flux converges toward the actual flux of the motor, the absolute value of the error signal decreases. Therefore, the absolute value of the error signal can be used to determine convergence or divergence. Further, as the estimated flux converges toward the actual flux of the motor, the error signal settles down and becomes less "jumpy" or "noisy." Therefore, in addition to or instead of using the absolute value of the error signal, a statistical or other measure of the error signal may be used to determine convergence or divergence. Accordingly, in this example, the variance of the error signal is estimated and employed. This can be done many different ways, including with a digital filter (e.g., having an output calculated from specified inputs that may or may not include previous inputs and/or outputs) There are also many other statistics, functions and estimates of such which can be used in place of (or in addition to) variance. For example, a change in variance or mean can be detected. Further, other methods for measuring the behavior of complex signals may be employed, including those used for cardiograph analysis, speech recognition and seismograph data analysis.

In this example embodiment, a digital rolling mean filter is employed. Alternatively, a variety of other filters, including digital low pass filters, may be used.

The definition of mean, variance and standard deviation are given as:

$$\text{Mean} = \frac{1}{N} \cdot \sum_{k=1}^{N} x_k \quad (3)$$

$$\text{Variance} = \frac{1}{N} \cdot \sum_{k=1}^{N} (x_k - \text{Mean})^2 \quad (4)$$

$$\text{Standard deviation} = +\sqrt{\text{Variance}} \quad (5)$$

A recursive rolling mean can be implemented in the following way:

$$\text{NewMean} = \alpha \cdot \text{OldMean} + (1-\alpha) \cdot \text{New Observation} \quad (6)$$

In this case, α is a continuous variable in the range 0 to 1.

It can be seen how this simple recursive expression can be used to develop approximations of the statistics defined above. The rolling mean is used in the first instance to estimate mean and then to generate an approximation of variance or standard deviation. Other statistics and/or measures (e.g., consistency, bias, efficiency, etc.) can be employed (including those that are recursive in nature, allowing for their application at each sample interval), though possibly with added computational cost.

Determining Convergence/Divergence

In this particular example, the behavior measure of the error function is variance. The values of variance are used to increment or decrement a counter, with the counter value representing convergence or divergence. Alternatively, the standard deviation values can be used to increment or decrement the counter. The mean square error is equal to the variance plus the square of the bias in the signal. Therefore, if there is no bias in the signal, the variance and standard deviation values will be nearly equivalent.

When the counter value lies in a defined range, the estimated flux is deemed to have substantially converged toward the actual flux of the motor. Likewise, when the counter value lies in another defined range, the estimated flux is deemed to have substantially diverged from the actual flux of the motor. The defined ranges for determining convergence and divergence are contiguous such that a single binary flag can be used to indicate both convergence and divergence.

The counter is incremented and decremented according to a set of rules. These rules may vary for any given implementation, and may vary depending on the operating condition of the motor. In this example, the counter is not continually incremented once the flag is set (indicating convergence), and is not decremented below zero. Further, the boundary values at which the flag is set or reset depend on whether convergence or divergence is occurring and whether it is the first time such an event has occurred.

A typical set of rules for the operation of the counter and the state flag are given below, where: the flag F is Boolean (1 or 0); the measure signal (M) is a continuous real variable; boundary values MaxC and MinC are positive integers and the counter value C is integer.

1. If flag not set (F equal to 0) and measure signal (M) less than boundary value (M < B1), increment counter (C = C + 1).
2. If flag is set (F equal to 1) and measure signal (M) less than boundary value (M < B1), do no increment counter (C = C).
3. If flag not set (F = 0) and measure signal (M) exceeds boundary range (M >= B) and counter (C > 0) is greater than zero decrement counter (C = C − 1).
4. If flag not set (F = 0) and measure signal (M) exceeds boundary range (M >= B) and counter (C) is greater than zero decrement counter (C = C − 1).
5. If counter (C) equal to maximum boundary value (C = MaxC) then set flag (F = 1).
6. If counter (C) less than minimum boundary value (C < MinC) then set flag (F = 0).

The value for MinC is usually greater than zero but less than MaxC. The values for M, MinC and MaxC may be fixed for a motor and drive or they may be allowed to vary according to a schedule, which may be defined by, e.g., the demanded speed, estimated power, etc. Through appropriate selection of the values for MinC, MaxC and boundary B, false alarms can be minimized.

Figure 7A:
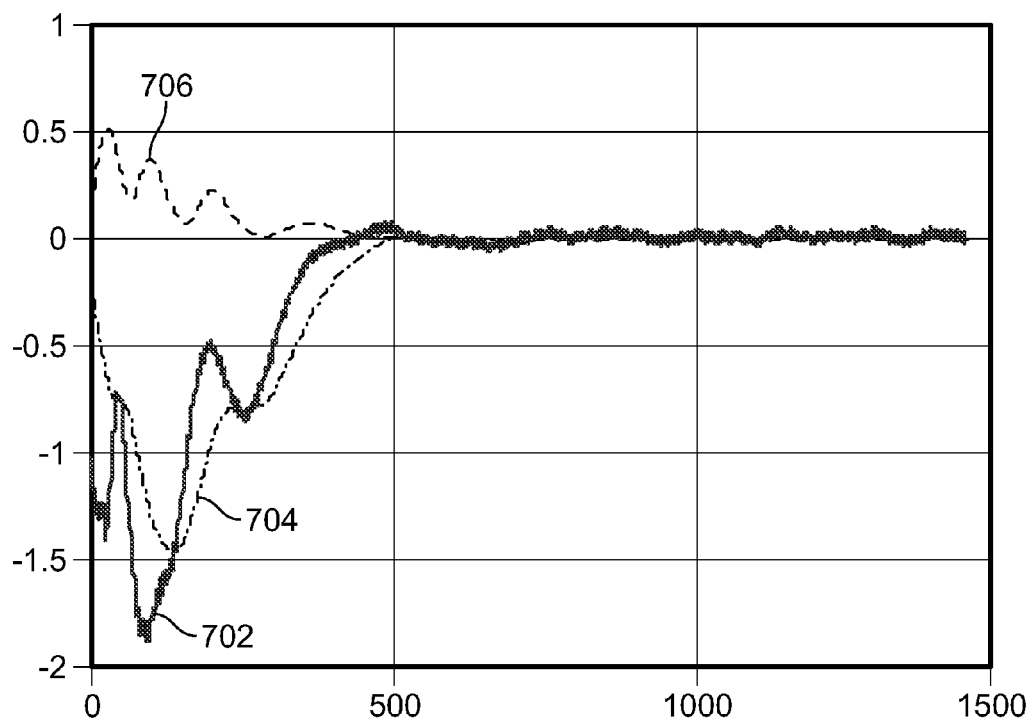
FIGS. 7A-7D illustrate plots of convergence detection using the variance of error in measured and estimated currents.
Figure 7B:
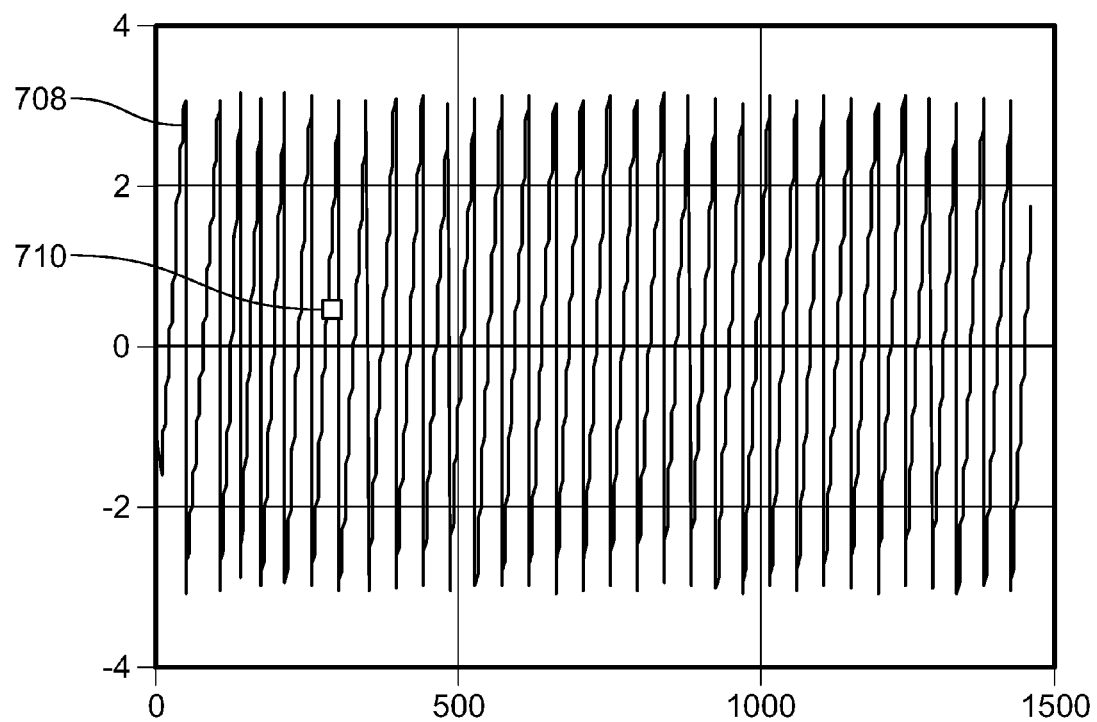
Figure 7C:
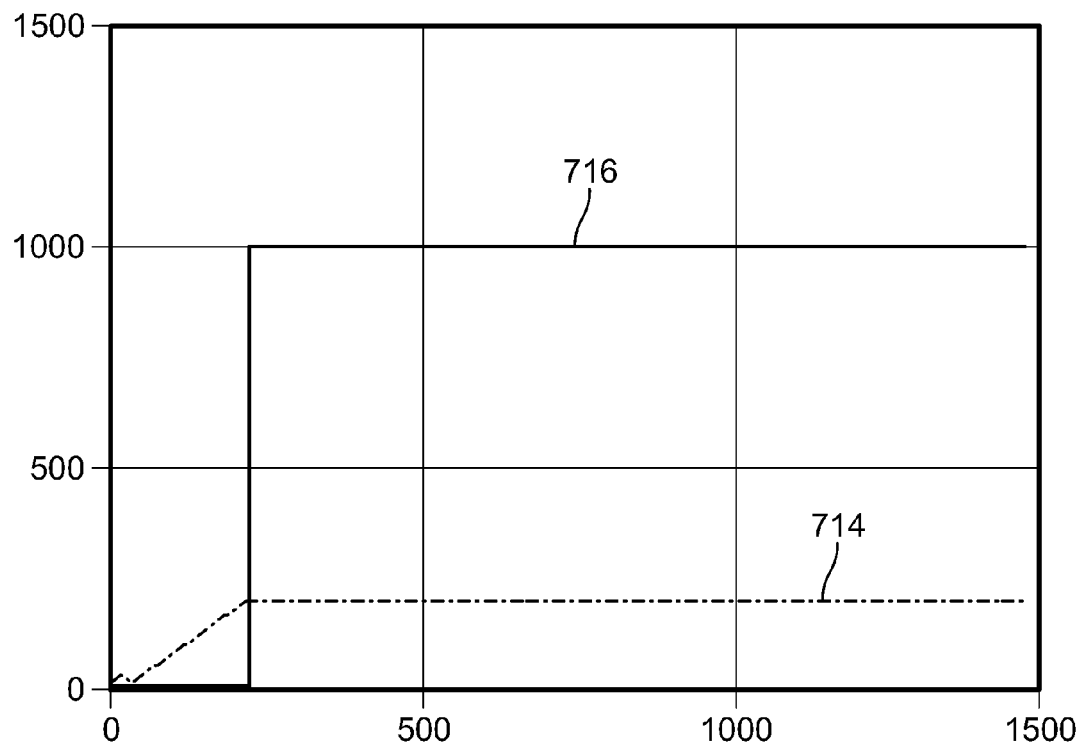
Figure 7D:
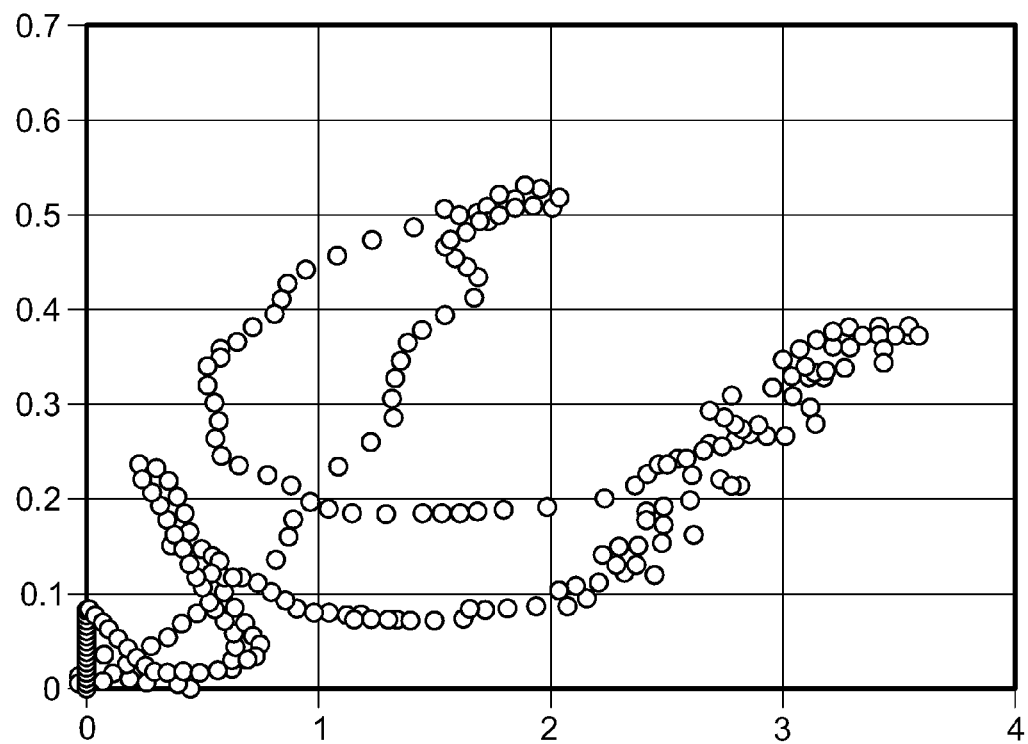

FIGS. 7A-7D illustrate exemplary plots generated using the example embodiment and convergence detection based upon the variance of error in the measured and estimated currents. An observer was applied to data gathered in steady state operation, and the output from the observer and detection scheme recorded. Specifically, FIG. 7A illustrates the error 702, rolling mean 704, and variance 706 signals; FIG. 7B illustrates the estimated angle 708 and convergence point (square 710); FIG. 7C illustrates whether the variance 714 is in range, and whether convergence 716 is detected (if the convergence signal 716 is high, convergence is detected); and FIG. 7D illustrates the variance signal vs. the error signal.

Figure 8A:
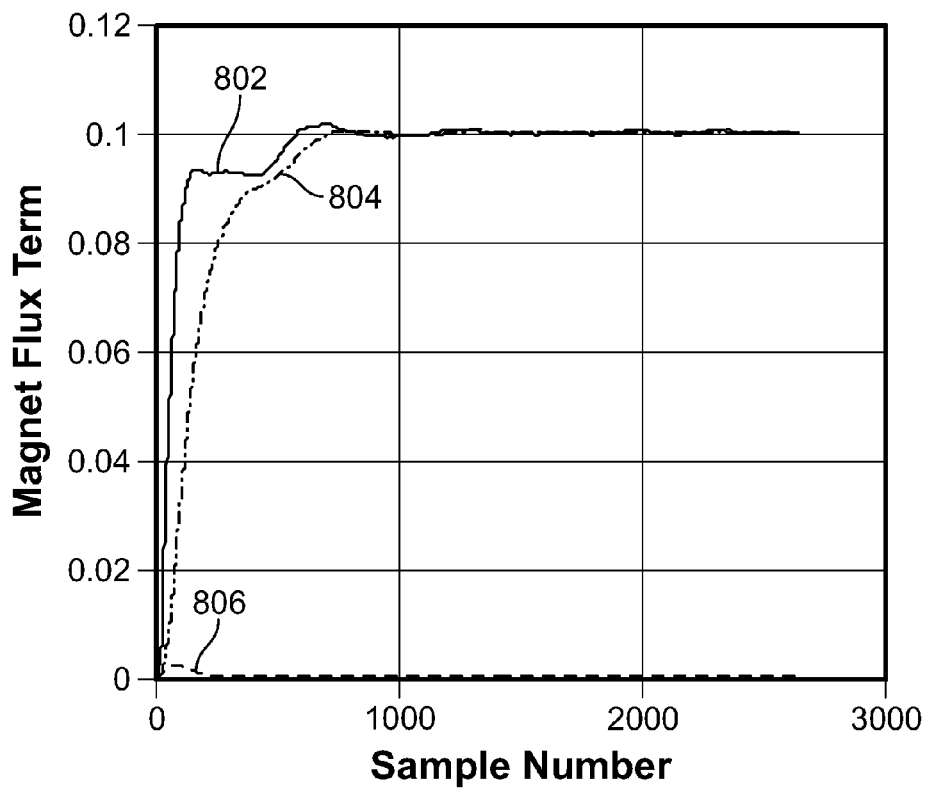
FIGS. 8A-8D illustrate plots of convergence detection using the variance of estimated magnet flux.
Figure 8B:
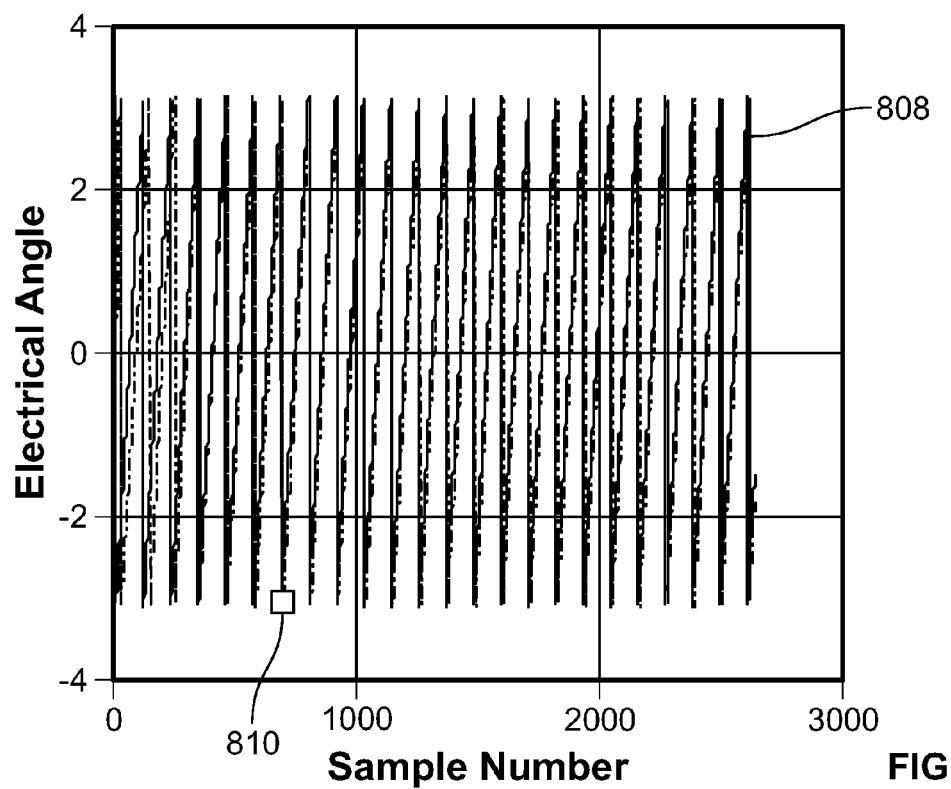
Figure 8C:
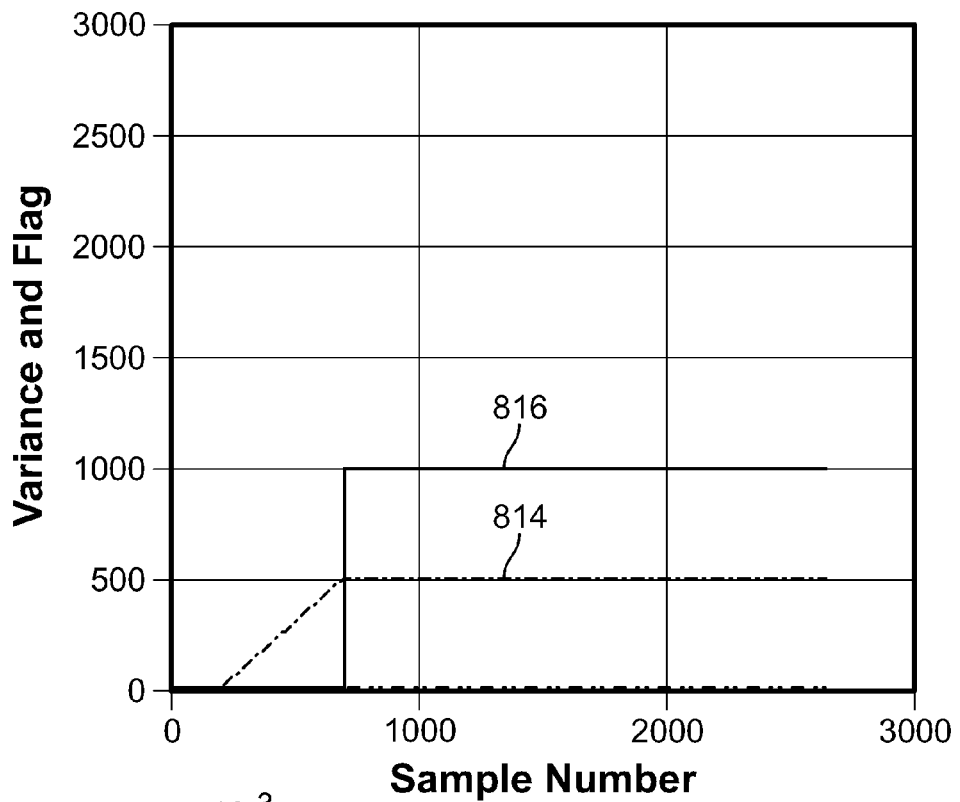
Figure 8D:
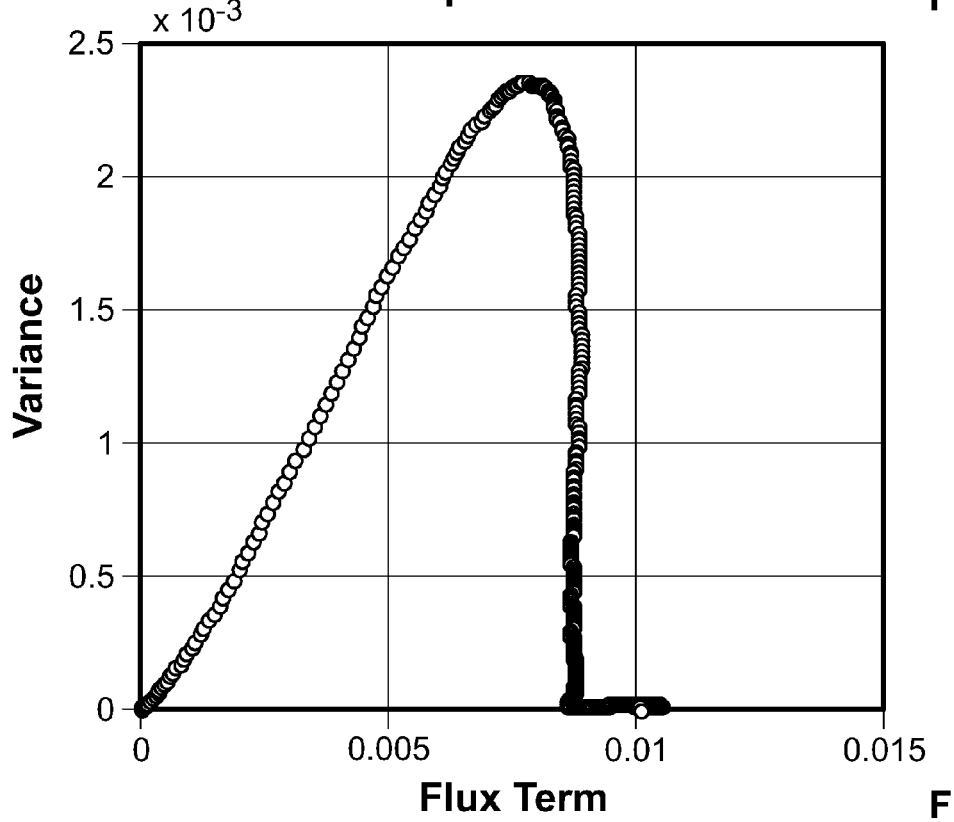

FIGS. 8A-8D illustrate exemplary plots generated using convergence detection based upon the variance signal of the estimated magnet flux. FIG. 8A illustrates the error 802, rolling mean 804, and variance 806 signals; FIG. 8B illustrates the estimated angle 808 and convergence point (square 810); FIG. 8C illustrates whether the variance 814 is in range, and whether convergence 816 is detected (if the convergence signal 816 is high, convergence is detected); and FIG. 8D illustrates the variance signal vs. the error signal.

The controller is also configured to monitor the bus voltage (not shown) supplied to the drive. In this example, the bus voltage is normally about 325 vdc. If the bus voltage drops below 200 volts vdc, the controller may decrease the demanded speed or stop driving the motor to prevent damage to the motor. When the bus voltage returns to 200 volts vdc or above, the controller tries to find the rotor using the methods described above. Typically, the rotor will be coasting down in speed during this time. If the controller finds the rotor, normal operation of the motor (i.e., using the estimated flux) can resume. Otherwise, the rotor can be allowed to stop before restarting the motor.

Further still, the controller is configured to detect a locked rotor condition upon start-up of the motor. For example, if the rotor is not found within a defined time duration, such as about four seconds, the controller will stop attempting to spin the motor. If desired, the controller may be configured to restart the motor after some period of time, which may be only two or three seconds or longer. Additionally, the controller may raise a locked rotor flag if the rotor is not found within the defined time duration upon startup. The locked rotor flag may be used by the controller and/or provided to (or read by) another controller (e.g., a system controller).

Some Alternatives for Generating the Function

The error function can be generated from the states available within the observer, which may or may not be augmented by additional variables from the drive. Recall Equation (1):

$$\delta I_{Qdv} = I_{Qdv} - \hat{I}_{Qdv} \quad (1)$$

There is a Qv-axis and a dv-axis current error. In its simplest form, the signal used by the scheme is some function of these errors. Examples include:

| | |
|---|---|
| Error only in the Qv-axis: | $I_{Qv} - \hat{I}_{Qv}$ |
| Square of the error in the Qv-axis: | $(I_{Qv} - \hat{I}_{Qv})^2$ |
| Dot inner product of the Qdv-error product: | $\delta I_{Qdv}' \cdot \delta I_{Qdv}$ equal to $(I_{Qv} - \hat{I}_{Qv})^2 + (I_{dv} - \hat{I}_{dv})^2$ |

One variation of this is to transform these variables from the drive frame of reference, the so-called Qdv frame of reference, to the electrical frame of reference or Qdr. The Qdv frame of reference variables can exhibit a slow sinusoidal oscillation. By placing them into the Qdr-frame of reference, this oscillation is removed.

| | |
|---|---|
| Error only in the Qr-axis: | $I_{Qv} - \hat{I}_{Qv}$ |
| Square of the error in the Qr-axis: | $(I_{Qr} - \hat{I}_{Qr})^2$ |
| Dot inner product of the Qdr-error product: | $\delta I_{Qdr}' \cdot \delta I_{Qdr}$ equal to $(I_{Qr} - \hat{I}_{Qr})^2 + (I_{dr} - \hat{I}_{dr})^2$ |

It should be appreciated that other types of error signals can be generated and used for determining convergence and divergence. For example, magnet flux is fixed in value, altering only as the magnets heat and cool. Consequentially, the magnet flux values provide another useful method for calculating a signal. In this case, the signal is not an error term but an absolute value of flux, the value of which is well known in advance from the basic machine design parameters.

In the drive frame of reference:

| | |
|---|---|
| Qv-axis magnet flux: | $\hat{\lambda}_{fQv}$ |
| dv-axis magnet flux: | $\hat{\lambda}_{fdv}$ |
| Dot inner product of the magnet flux estimate: | $\hat{\lambda}_{fQv}^2 + \hat{\lambda}_{fdv}^2$ |

In the electrical frame of reference:

| | |
|---|---|
| Qr-axis magnet flux: | $\hat{\lambda}_{fQr}$ |
| dr-axis magnet flux: | $\hat{\lambda}_{fdr}$ |
| Dot inner product of the magnet flux estimate: | $\hat{\lambda}_{fQr}^2 + \hat{\lambda}_{fdr}^2$ |

Alternatively, values involving the total flux linkage in the Q and d-axis can be used. These are quasi-stationary values, although the values may change depending on the stator winding energization.

Drive Frame of Reference:

| | |
|---|---|
| Qv-axis flux linkage: | $\hat{\lambda}_{Qv}$ |
| dv-axis flux linkage: | $\hat{\lambda}_{dv}$ |
| Dot inner product of the Qdv- flux estimate: | $\hat{\lambda}_{Qv}^2 + \hat{\lambda}_{dv}^2$ |

Electrical Frame of Reference:

| | |
|---|---|
| Qr-axis flux linkage: | $\hat{\lambda}_{Qr}$ |
| dr-axis flux linkage: | $\hat{\lambda}_{dr}$ |
| Dot inner product of the Qdr- flux estimate: | $\hat{\lambda}_{Qr}^2 + \hat{\lambda}_{dr}^2$ |

One may also choose to normalize the estimated expression(s), for example, to produce nominal maximum current, nominal magnet flux, etc.

In the case of those signals representing magnet flux, a test can be used to determine whether the value $\hat{\lambda}_{fQr}$ lies within some percentage of the expected value known from the design, such as:

IS $(\hat{\lambda}_{fQr} \geq a \cdot \lambda_{motor})$ AND $(\hat{\lambda}_{fQr} \leq b \cdot \lambda_{motor})$ where $a \leq 1$ and $b \geq 1$.

As noted above, whether the estimated flux has substantially converged or diverged can be determined many different ways, each having its own advantage or disadvantage. In addition, two (or more) separate tests may be combined for improved results, including a reduced incidence of false alarms.

In one example embodiment, a first test is based on the error in the Qr-axis current, and a second test is based on the value of the Qr-magnet flux.

Regardless of the tests employed, a positive result from two separate tests (i.e., an AND operation) can be required before indicating a lost or found rotor. Alternatively, a positive result from one test may be required before a second test is started, or the two tests may be passed through an OR operation, etc.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. A method of controlling a permanent magnet motor, the method comprising:
   estimating flux of the motor;
   determining whether the estimated flux has substantially converged toward an actual flux of the motor including estimating a value of another motor operating parameter in a reference frame using the estimated flux, and comparing the estimate of said motor operating parameter with a measured value of said motor operating parameter in said reference frame including producing an error signal from the estimated and measured values of said motor operating parameter and processing the error signal to determine whether the estimated flux has substantially converged toward the actual flux; and
   in response to determining the estimated flux has substantially converged toward the actual flux, using the estimated flux to control the motor.

2. The method of claim 1 wherein said motor operating parameter is current flow.

3. The method of claim 1 wherein estimating includes using the error signal to improve a next estimate of the motor flux.

4. The method of claim 1 wherein processing includes producing statistical information for the error signal.

5. The method of claim 4 wherein the statistical information includes mean, variance and/or standard deviation.

6. The method of claim 4 wherein processing includes processing the error signal with a digital filter to produce the statistical information.

7. The method of claim 6 wherein processing includes incrementing and/or decrementing a counter according to an output of the digital filter.

8. The method of claim 7 wherein the output of the digital filter is a recursive rolling mean for the error signal.

9. The method of claim 7 wherein processing includes incrementing and/or decrementing the counter according to a set of counter rules and the output of the digital filter.

10. The method of claim 9 wherein the counter rules depend on the operating state of the motor.

11. The method of claim 1 wherein flux includes magnet flux and flux linkage terms.

12. The method of claim 1 wherein estimating includes estimating the flux value using an observer.

13. The method of claim 1 wherein the motor does not include a rotor position sensor.

14. The method of claim 1 wherein using includes estimating a value of another motor operating parameter using the estimated flux, and using the estimated value of said motor operating parameter to control the motor.

15. The method of claim 14 wherein said motor operating parameter is electrical angle or speed.

16. The method of claim 1 wherein using includes using the estimated flux to control motor current or motor flux.

17. The method of claim 1 wherein estimating includes estimating the flux using measured or demanded phase currents and/or phase voltages of the motor.

18. The method of claim 1 further comprising transitioning from a first control mode to a second control mode in response to determining the estimated flux has substantially converged toward the actual flux.

19. The method of claim 18 wherein the first control mode is an open loop control mode and the second control mode is a closed loop control mode.

20. The method of claim 19 wherein the closed loop control mode is a closed loop sensorless control mode.

21. The method of claim 1 wherein determining includes determining whether the estimated flux has substantially converged toward the actual flux during start-up of the motor.

22. The method of claim 21 wherein using includes using the estimated flux to control the motor immediately after determining the estimated flux has substantially converged toward the actual flux.

23. A controller for a permanent magnet motor, the controller configured to perform the method of claim 1.

24. An assembly comprising a permanent magnet motor and the controller of claim 23.

25. A method of controlling a permanent magnet motor, the method comprising:
    estimating flux of the motor;
    determining whether the estimated flux has substantially converged toward an actual flux of the motor;
    in response to determining the estimated flux has substantially converged toward the actual flux, transitioning from a first control mode to a second control mode and using the estimated flux to control the motor.

26. The method of claim 25 wherein determining includes estimating a value of another motor operating parameter in a reference frame using the estimated flux, and comparing the estimate of said motor operating parameter with a measured value of said motor operating parameter in said reference frame.

27. The method of claim 25 wherein the first control mode is an open loop control mode and the second control mode is a closed loop control mode.

28. The method of claim 27 wherein the closed loop control mode is a closed loop sensorless control mode.

29. The method of claim 25 wherein the first control mode is one of a speed control mode and a torque control mode and wherein the second control mode is the other of said one of a speed control mode and a torque control mode.

* * * * *